US011853737B1

(12) United States Patent
Lu et al.

(10) Patent No.: US 11,853,737 B1
(45) Date of Patent: Dec. 26, 2023

(54) METADATA DRIVEN PRODUCT CONFIGURATION MANAGEMENT

(71) Applicant: Wells Fargo Bank, N.A., San Francisco, CA (US)

(72) Inventors: Guor-Huar Lu, Woodbury, MN (US); Ian David Burton, Roseville, CA (US); Robert R. Miller, II, Waxhaw, NC (US); Shawn Patrick Clark, Hastings, MN (US); Javin Jacob Sword, Guthrie Center, IA (US); Abir Sleiman Abukhadra, Minneapolis, MN (US); Barry Michael Evans, Glendale, AZ (US); Adam Waud, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/335,842

(22) Filed: Jun. 1, 2021

Related U.S. Application Data (63) Continuation of application No. 16/211,784, filed on Dec. 6, 2018, now Pat. No. 11,023,218.

(60) Provisional application No. 62/612,471, filed on Dec. 31, 2017.

(51) Int. Cl.
| | |
|---|---|
| *G06F 8/65* | (2018.01) |
| *G06F 9/54* | (2006.01) |
| *G06F 16/2455* | (2019.01) |
| *G06F 21/57* | (2013.01) |

(52) U.S. Cl.
CPC ............... *G06F 8/65* (2013.01); *G06F 9/542* (2013.01); *G06F 16/2455* (2019.01); *G06F 21/577* (2013.01); *G06F 2221/033* (2013.01)

(58) Field of Classification Search
CPC ................................ G06F 8/65; G06F 21/577
USPC ......................................................... 717/168
See application file for complete search history.

(56) References Cited

U.S. PATENT DOCUMENTS

| | | | |
|---|---|---|---|
| 6,873,997 B1 | 3/2005 | Majjasie et al. | |
| 7,013,331 B2 | 3/2006 | Das | |
| 7,756,828 B2 * | 7/2010 | Baron | G06Q 10/06 707/634 |
| 7,949,628 B1 * | 5/2011 | Blazek | G06F 16/21 707/603 |

(Continued)

OTHER PUBLICATIONS

Carma McClure, "Asset Management Process," in Software Reuse: A Standards-Based Guide, IEEE, 2001, pp. 147-171, doi: 10.1109/9781118156681.ch5.*

(Continued)

*Primary Examiner* — Francisco J Aponte
(74) *Attorney, Agent, or Firm* — SCHWEGMAN LUNDBERG & WOESSNER, P.A.

(57) ABSTRACT

A method may include: receiving a notification of a triggering event, the triggering event identifying an associated product; accessing a baseline configuration for the product; transmitting a notification to a recipient responsible for maintaining the baseline configuration for the product; receiving an approved update to the baseline configuration from the recipient; generating an updated baseline configuration for the product based on the approved update; querying a database to identify an application subscriber for the triggering event for the product; and transmitting the updated baseline configuration to the identified application subscriber.

20 Claims, 5 Drawing Sheets

(56) References Cited

U.S. PATENT DOCUMENTS

| | | | |
|---|---|---|---|
| 8,161,456 B2 | 4/2012 | Bojjireddy et al. | |
| 8,225,281 B1* | 7/2012 | Hardinger | G06F 8/70 |
| | | | 717/174 |
| 8,321,540 B2 | 11/2012 | Webb-johnson | |
| 8,429,639 B2 | 4/2013 | Jirka | |
| 8,539,589 B2* | 9/2013 | Prafullchandra | G06Q 10/06 |
| | | | 726/25 |
| 8,572,565 B2 | 10/2013 | Bozak et al. | |
| 8,583,769 B1 | 11/2013 | Peters et al. | |
| 8,638,692 B2 | 1/2014 | Gale et al. | |
| 8,762,508 B2* | 6/2014 | Shah | G06F 9/44505 |
| | | | 709/223 |
| 8,782,201 B2 | 7/2014 | Kephart et al. | |
| 8,832,107 B2 | 9/2014 | Sachs | |
| 8,898,791 B2* | 11/2014 | Brando | G06F 8/61 |
| | | | 726/23 |
| 9,059,898 B2 | 6/2015 | Mallya et al. | |
| 9,118,709 B2* | 8/2015 | Oliphant | H04L 63/1416 |
| 9,274,811 B1* | 3/2016 | Reeves | G06F 9/445 |
| 9,489,654 B2 | 11/2016 | Martinez-ablanedo | |
| 9,552,214 B2 | 1/2017 | Stern et al. | |
| 9,553,765 B2 | 1/2017 | Kalyana et al. | |
| 9,690,564 B2* | 6/2017 | Bhat | G06F 8/65 |
| 9,712,388 B2* | 7/2017 | Mishra | H04L 41/0853 |
| 10,241,775 B2* | 3/2019 | Naqvi | H04L 67/42 |
| 10,282,426 B1* | 5/2019 | Lerner | G06F 16/23 |
| 10,353,699 B1* | 7/2019 | Yu | G06F 8/71 |
| 10,394,500 B2* | 8/2019 | Nakajima | G06F 3/1254 |
| 10,404,833 B1* | 9/2019 | de Sales, Jr. | H04L 67/1097 |
| 10,505,805 B1* | 12/2019 | Viswanathan | H04L 41/0856 |
| 10,545,755 B2* | 1/2020 | Garay | G06F 16/2365 |
| 11,023,218 B1 | 6/2021 | Lu et al. | |
| 2003/0033379 A1 | 2/2003 | Civanlar et al. | |
| 2005/0114479 A1* | 5/2005 | Watson-Luke | G06F 8/71 |
| | | | 715/735 |
| 2006/0136437 A1* | 6/2006 | Yamasaki | G06F 21/604 |
| 2007/0113265 A2* | 5/2007 | Oliphant | G06F 8/60 |
| | | | 726/1 |
| 2009/0007097 A1* | 1/2009 | Hinton | G06F 8/61 |
| | | | 717/176 |
| 2010/0058114 A1* | 3/2010 | Perkins | G06Q 10/06 |
| | | | 714/39 |
| 2011/0047536 A1* | 2/2011 | Santos | G06F 8/71 |
| | | | 717/170 |
| 2011/0055153 A1* | 3/2011 | Hashimoto | G06F 8/71 |
| | | | 707/622 |
| 2011/0153557 A1* | 6/2011 | Bernstein | G06F 8/71 |
| | | | 707/E17.005 |
| 2012/0110142 A1* | 5/2012 | Montagna | G06F 8/71 |
| | | | 709/220 |
| 2013/0167139 A1* | 6/2013 | Arcilla | G06F 21/57 |
| | | | 717/175 |
| 2014/0280958 A1* | 9/2014 | DeLeo | H04L 47/70 |
| | | | 709/226 |
| 2015/0033353 A1* | 1/2015 | Oliphant | G06F 21/577 |
| | | | 726/25 |
| 2015/0082291 A1* | 3/2015 | Thomas | G06F 8/658 |
| | | | 717/168 |
| 2015/0199188 A1* | 7/2015 | Mantripragada | G06F 8/60 |
| | | | 717/101 |
| 2015/0281285 A1 | 10/2015 | Bharali et al. | |
| 2016/0132314 A1* | 5/2016 | Solsona-Palomar | |
| | | | G06F 9/44505 |
| | | | 717/172 |
| 2016/0149761 A1 | 5/2016 | Liu | |
| 2016/0292065 A1* | 10/2016 | Thangamani | G06F 11/079 |
| 2017/0068810 A1* | 3/2017 | Yao | G06F 21/51 |
| 2017/0142228 A1* | 5/2017 | Byrne | H04L 67/1004 |
| 2017/0212753 A1* | 7/2017 | Johnston | G06F 8/65 |
| 2017/0310745 A1* | 10/2017 | Kim | G06F 8/61 |
| 2018/0091558 A1* | 3/2018 | Daugherty | G06F 21/577 |
| 2018/0121486 A1* | 5/2018 | Puvvada | G06F 16/2365 |
| 2018/0159887 A1* | 6/2018 | DiGiambattista | G06F 21/577 |
| 2018/0167380 A1* | 6/2018 | Debickes | G06F 21/57 |
| 2018/0307861 A1* | 10/2018 | Johnson | G06F 21/64 |
| 2018/0321934 A1* | 11/2018 | Chaganti | G06F 8/61 |
| 2019/0018671 A1* | 1/2019 | Zhu | H04L 67/1008 |
| 2019/0068650 A1* | 2/2019 | Castel | H04L 63/205 |
| 2019/0190776 A1* | 6/2019 | Bregman | G06F 9/5072 |
| 2019/0190888 A1* | 6/2019 | Madden | G06F 21/6281 |
| 2020/0089488 A1* | 3/2020 | Yu | G06F 21/44 |
| 2020/0119983 A1* | 4/2020 | D'Onofrio | H04L 41/0609 |
| 2021/0176210 A1* | 6/2021 | Chan | G06F 21/572 |
| 2022/0326930 A1* | 10/2022 | Nandavar | H04L 67/1097 |

OTHER PUBLICATIONS

McClure, Carma. Software Reuse. Wiley-IEEE Computer Society Press, New York, 2001.*

"U.S. Appl. No. 16/211,784, Advisory Action dated Jul. 30, 2020", 3 pgs.

"U.S. Appl. No. 16/211,784, Final Office Action dated May 20, 2020".

"U.S. Appl. No. 16/211,784, Non Final Office Action dated Feb. 6, 2020".

"U.S. Appl. No. 16/211,784, Non Final Office Action dated Sep. 23, 2020".

"U.S. Appl. No. 16/211,784, Notice of Allowance dated Feb. 3, 2021".

"U.S. Appl. No. 16/211,784, Response filed May 6, 2020 to Non Final Office Action dated Feb. 6, 2020", 9 pgs.

"U.S. Appl. No. 16/211,784, Response filed Jul. 14, 2020 to Final Office Action dated May 20, 2020", 9 pgs.

"U.S. Appl. No. 16/211,784, Response filed Dec. 21, 2020 to Non Final Office Action dated Sep. 23, 2020".

"Choose a Type of WSUS Deployment", [Online]. [Accessed Jun. 5, 2017]. Retrieved from the Internet: <URL: https://technet.microsoft.com/en-us/library/cc720448%28v=ws.10%29.aspx>, 7 pgs.

Gillis, Orlee, "New Reviews for 2017: Software Configuration Management Roundup", [Online]. [Accessed Jun. 5, 2017]. Retrieved from the Internet: <URL: http://blog.itcentralstation.com/review-roundup-software-configuration-management-new-2017/>, (Feb. 16, 2017), 5 pgs.

* cited by examiner

METADATA DRIVEN PRODUCT CONFIGURATION MANAGEMENT

CROSS-REFERENCE TO RELATED APPLICATION

This patent application is a Continuation of U.S. patent application Ser. No. 16/211,784, filed Dec. 6, 2018, which claims the benefit of U.S. Provisional Patent Application No. 62/612,471, filed Dec. 31, 2017, which are incorporated by reference herein their entirety.

BACKGROUND

Maintaining systems across an enterprise environment may involve creating configurations for each system. A configuration may include what products (e.g., applications) to install on the system as well as enterprise specific policies. When a vulnerability for a product is detected someone from the enterprise may need to meet with the product owner to determine how to address the vulnerability and then update the configurations affected by the vulnerability.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Maintaining up-to-date configurations for products (e.g., applications) and assets (e.g., computing systems) in an enterprise environment present a number of challenges. For example, the configurations themselves may come in different formats. Some may be text-based (e.g., largely human readable), while others may include structured data according to a defined schema. Furthermore, even for one application there may be multiple configuration files to support the different types of systems the application may be installed upon. For example, some machines may use Linux variants of the application while others use MICROSOFT WINDOWS®.

An additional problem is a lack of a common schema and technical language necessary for asset owners to understand and manage relationships between policy adherence and desired configuration including the relationships of all types of assets that require configuration baselines and management in a modern large corporate enterprise IT ecosystems.

Due to the complex nature of an enterprise environment, many enterprises rely on human operators to maintain the configurations. Once a new vulnerability (or other event that needs addressing) is discovered for the application, a user may update one or more configuration files and then push it out to affected systems. However, updating configuration files often include taking a number of factors into account. These factors may include security policies, standards, which version to use, and sometimes there may be different interpretations of policies for servers versus desktop installations, among others.

Use of human operators may lead to inconsistencies and errors depending on who updated the configuration file. Additionally, there is often a lack of traceability of what interpretations were made to update the configuration. Accordingly, when errors are made, a substantial amount of rework may be involved leading to downtime for systems that are needed for operations of the enterprise. Additionally, there may be multiple people in different lines of business and enterprise making different choices based on the same security vulnerability. This, again, leads to inconsistency, as well as redundant work that may be better suited to a single person or automated entity.

Another problem with the way existing configuration management is implemented is the silo'ed nature of interfacing with downstream tools. For example, numerous automated system configuration tools exist. Accordingly, for patches of an application, separate solutions need to be implemented for each system configuration tool used by an enterprise. Similarly, for vulnerability data, separate solutions need to be implemented for each system configuration tool. Not only does this mean a great deal of manual work, but it may lead to system vulnerabilities and risks being present in one system configuration tool—and therefore the enterprise—but not in another depending on which personnel implemented the particular solution.

Even existing system-level configuration tools may not be able to automate installation of specialized products. Accordingly, even if an enterprise is relying upon some automated tools there still exists a need for human operators, which leads to the same problems described above.

In order to alleviate some of the problems above, systems and methods are described herein to use a product and asset configuration management system (referred to as PACMS or configuration management system herein). The PACMS may automate much of the work that used to be done by human operators; however, it goes beyond merely automating what was done before by virtue of being able to create traceability records and creating abstracted output that is useable by a number of downstream consuming resources. For example, the PACMS uses a new data model that abstracts away many of the differences between product and system types to allow for efficient use of computing resources when updating configurations, and permitting a diverse set of trigger events to use the same process workflow.

The configuration management system may operate by respond to triggering events, signaling that certain systems need to be updated in response to the triggering event, notifying the correct personnel, and then verifying that the triggering event has been resolved for the systems. More details of each of these operations and the benefits of them are discussed below.

The system and method prescribes a common metadata model/schema and implementation directed to create a common domain language for solving Product and Asset configuration baseline creation, description, implementation, synchronization and version control including relation to corporate policies in User, Product, Patch, Vulnerability, Inventory and Security domains. The system and method may enable the abstraction of homogenous implementations of specific automated and manual solutions for controlled acquisition, provisioning, detection and correction of configuration drift between disparate automated and manual operational processes against Corporate Properties, Hardware, Software, Network, Compute, Storage and Data Systems (All controlled assets) within a large IT systems environment in which the existing environment spans multiple disparate tools, technologies and methods to manage configuration and drift for the enterprise.

Figure 1:
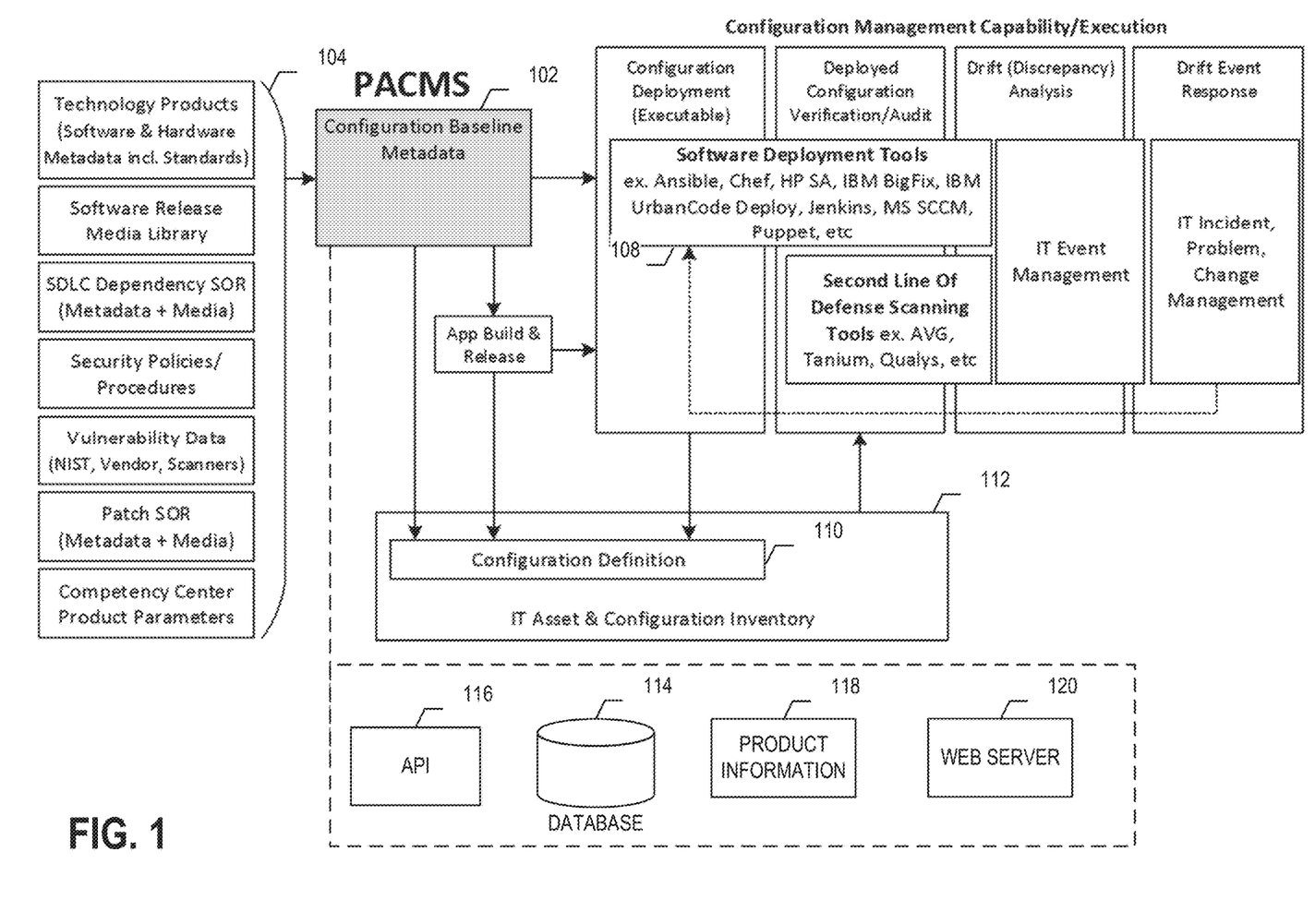
FIG. 1 illustration is a schematic representation of components interacting with a product and asset configuration management system (PACMS), according to various examples.

FIG. 1 illustration is a schematic representation of components interacting with a product and asset configuration management system (PACMS), according to various examples. Among some of the illustrated components are PACMS 102, input data sources 104, software deployment tools 108, configuration definition 110, inventory 112, database 114, API 116, product information 118, and web server 120.

PACMS 102 may exist as one or a series of computing systems to enable users and systems to create, update, and consume configuration files for products. In various examples, the assets and components in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

A user may access PACMS 102 using a client device (not illustrated). A client device may comprise, but is not limited to, a smartphone, tablet, laptop, multi-processor system, microprocessor-based or programmable consumer electronics, game console, set-top box, or any other device that a user utilizes to communicate over a network. In example embodiments, the client device comprises a display module (not shown) to display information (e.g., in the form of specially configured user interfaces). In some embodiments, the client device may comprise one or more of a touch screen, camera, keyboard, microphone, and Global Positioning System (GPS) device.

For illustration purposes, PACMS 102 (as well as other parts of FIG. 1) is illustrated as set of separate components. However, the functionality of individual components may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Data used in the PACMS 102 may be organized and stored in a variety of manners. For convenience, the organized collection of data is described herein as the database 114. The specific storage layout and model used in database 114 may take a number of forms—indeed, database 114 may utilize multiple models. The database 116 may be, but is not limited to, a relational database (e.g., SQL), non-relational database (NoSQL) a flat file database, object model, document details model, graph database, shared ledger (e.g., blockchain), or a file system hierarchy. The database 114 may store data on one or more storage devices (e.g., a hard disk, random access memory (RAM), etc.). The storage devices may be in standalone arrays, part of one or more servers, and may be located in one or more geographic areas Input data sources 104 represent types of data that may be abstracted into a baseline configuration file for a product (an example of which is illustrated in more detail in FIG. 2). A baseline configuration may be stored in configuration definition 110 as part of an IT asset and configuration inventory 112 data store. Additionally, input data sources 104 may represent sources that PACMS 102 may receive data from for triggering events related to updating an existing baseline configuration file for a product.

In order to allow multiple input data sources (e.g., input data sources 104) that may affect a product configuration and multiple disparate consumers of configuration files, a universal configuration file may be generated on a per product basis. The format of the universal configuration file, also referred to as a baseline configuration file, may be standardized according to a predefined data model/schema and include metadata related to the various input data sources. In an example, the configuration file is a JavaScript Object Notation (JSON) file, but other formats may be used. The universal configuration file may include metadata that is product agnostic, as well as product specific.

Metadata may include the name of a product, and identification of the product beyond the need, an identification of the configuration, the version of the product, and the status of the product. Metadata may further indicate the date identity the last person to approve product baseline configuration and in some instances the last person to review the configuration. Additionally, metadata may identify product configuration baseline may identify related baseline configurations and any comments. Metadata may also include security parameters associated with the product and operational parameters. Finally, if applicable, patch identifications (e.g., patch levels) for the product may be included in the product configuration baseline.

For example, a universal configuration file for Product X may include metadata that includes a release identifier of a security parameter that is in force for Product X. Accordingly, downstream consumers of the configuration file for product X may use the release identifier to obtain additional information about the security policy and configure systems the consumer (e.g., software deployment tools 108) is responsible for and act accordingly. In some examples, information about the security policy is included within the metadata for the configuration file. For example, a security policy may indicate that session inactivity timeout should not exceed 15 minutes. The configuration file for Product X may also include operational parameters for the product such as allowable installation locations.

To facilitate efficient processing of data coming from product owners, a baseline configuration for a product may be defined in accordance with the product owner. Consider the situation in which a vulnerability exists related to the copy-and-paste function of a product. The product owner may issue a notification to the enterprise about the vulnerability recommending that the function be disabled until a patch may be released. However, unless the information included in the notification may be readily matched up with fields in the configuration file, manual work may still need to be completed before an update can be issued to downstream tools. By working with the product owner, the baseline configuration may be established such that information in any sort of vulnerability release is formatted in a way that is machine-readable and transferable to the data model established with respect to the baseline configuration for the product.

Once an updated baseline has been created, other downstream software tools may consume the new baseline. For example, if a particular version of an application has been blacklisted, a system configuration tool (e.g., software deployment tools 108) or manager may then also know that the particular version should be not be installed or updated on systems of the enterprise. Then, the tool may notify affected systems (or owners of the system) that they cannot use the blacklisted version.

PACMS 102 may provide a subscription model to which different entities may subscribe to changes in product baselines. For example, a system configuration tool may, through the use of API 116 provided by CMS, indicate that the tool once to be notified of all change for product X and product Y. However, more granular subscriptions may also be made available by the CMS. For example, the system configuration tool may we want notifications of vulnerability data or patch data for product Z.

To facilitate the subscriptions, the PACMS 102 may entries for each product and entities that have indicated they wish to be notified of changes with the product (e.g., database 114 and product information 118). Entries may include a logical address to send a notification to (e.g., an email address, a web address, etc.). If requested, the entries may also indicate the type of subscriptions, such as vulnerability data for a product.

Upon receiving notification from PACMS 102, a consumer of a universal configuration file for the product (e.g., system configuration tool) may perform necessary updates according to the tools own internal logic. In some examples, an updated configuration file may lead to the creation of a script or executable to transmit to the consumer. Because a configuration file is formatted according to a defined data model consistent scripts/executables may be generated for the consumer. In other examples, the consumer performs its own translations.

In many instances, there may be multiple triggers related to a single event. For example, if a vulnerability exists for a product there is often a patch for the product that comes out at the same time. PACMS 102 may be responsible for deduplicating trigger events. In other words, PACMS 102 be responsible for issuing a single baseline update, even though multiple input sources have indicated an update may be warranted. To perform the deduplication, PACMS 102 may compare product identifiers across triggering events.

Web server 120 may be used by users to interact with baseline configuration files stored in PACMS 102. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of a web application served by PACMS 102 (e.g., a configuration tool editor). In response, web server 120 may transmit a web page that is rendered on a display device of a client device. As discussed further with respect to FIG. 3, web server 120 may also provide an interface for product owners to approve or edit suggest changes to a configuration file.

Figure 2:
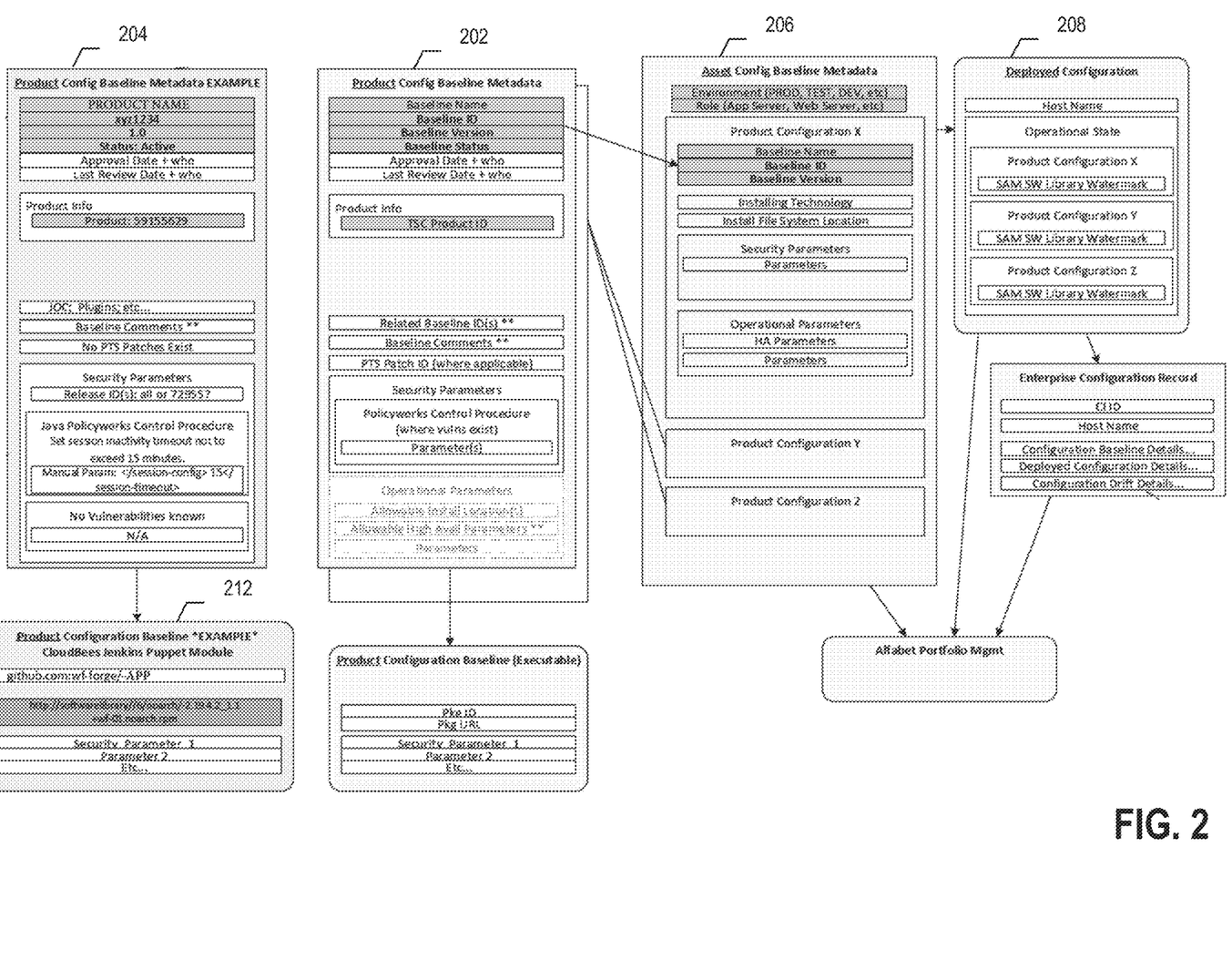
FIG. 2 illustrates a metadata model, according to various examples.

FIG. 2 illustrates a metadata model, according to various examples. FIG. 2 illustrates product configuration baseline definition 202, product configuration baseline example 204, asset configuration baseline metadata 206, deployed configuration 208, software tool module example 212, and product configuration baseline executable 214. The order and labels presented in FIG. 2 are for illustration purposes and other labels and configurations may be used without departing from the scope of this disclosure.

Product configuration baseline definition 202 illustrates information that may be included in a baseline configuration file. The metadata populated in product configuration baseline definition 202 may originate from a number of input sources (e.g., input data sources 104). In some examples, PACMS 102 maintains systems of record (SOR) for each type of data source. Accordingly, when a configuration file is created or updated, PACMS 102 may access the SOR for a particular input data source to update a product configuration file.

Product configuration baseline definition 202 is also associated with a product configuration baseline executable 214 which may be generated based on predefined scripts. Additionally, asset configuration baseline metadata 206 and deployed configuration 208 illustrate how a product configuration file may be incorporated into larger and larger components of an enterprise.

An example filled in configuration file for a product is presented in product configuration baseline example 204. As illustrated, this product may also generate software tool module example 212 for consumption by a downstream system configuration tool.

Figure 3:
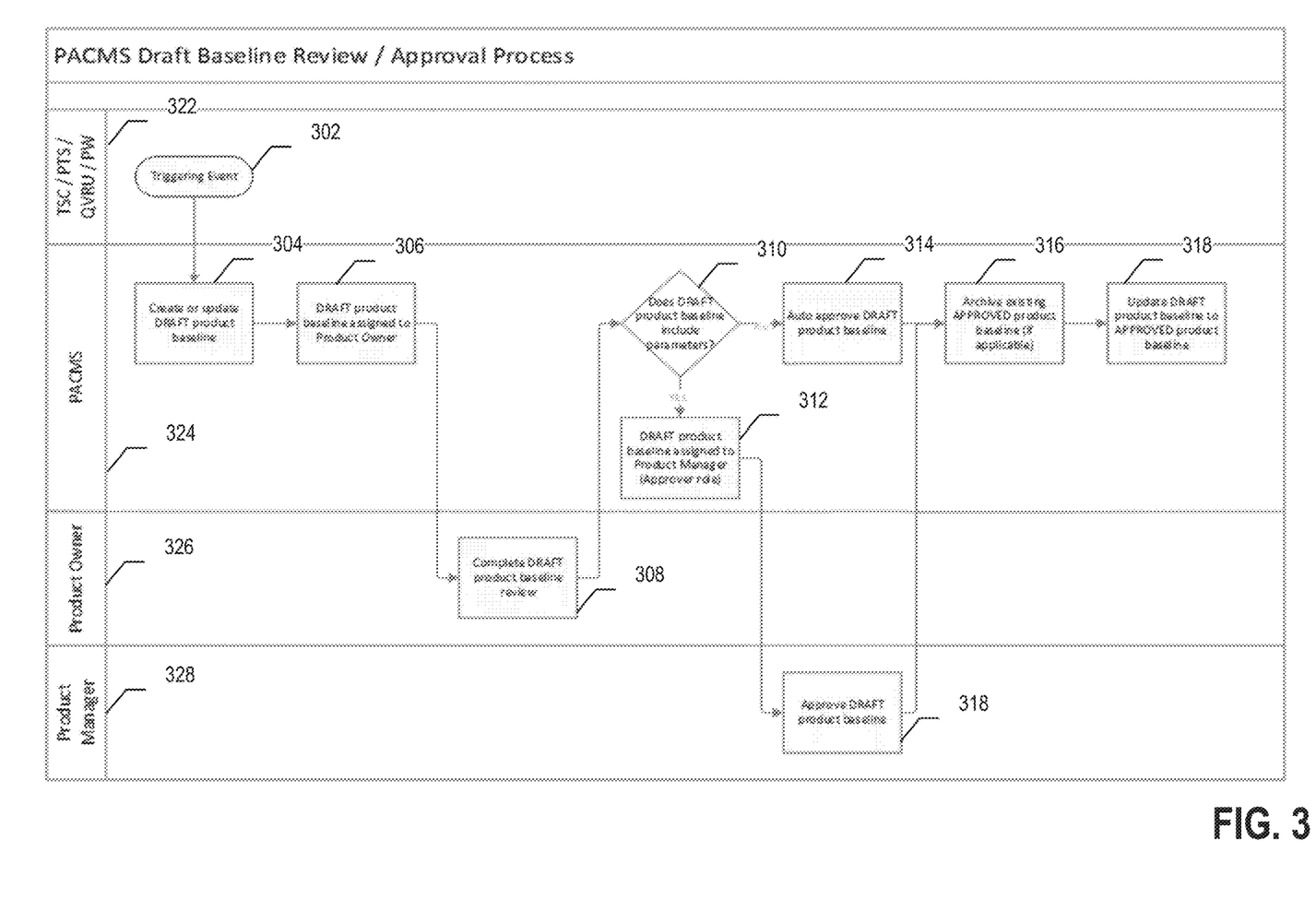
FIG. 3 illustrates a data flow diagram in response to a triggering event, according to various examples.

FIG. 3 illustrates a data flow diagram in response to a triggering event, according to various examples.

At block 302 a triggering event is detected. A triggering event may be, but is not limited to, a new vulnerability, patch, new security policy, or compliance requirement. The triggering event may have been detected by any number of system without departing from the scope of this disclosure. For example, an application manufacturer may transmit notifications of purchasers/users of the application that a new patch exists for the application. The triggering event may originate from a central reporting repository communicatively coupled to PACMS 102. The triggering event may be associated with a product identification.

In response to the event, control flows to PACMS layer 324 where at block 304, a check is performed to see if a draft product baseline exists. The check may be completed using the product identification in the triggering event (e.g., searching database 114 or inventory 112). If, not, a new version of the baseline for the product is created based on a stored standardized data model (e.g., product configuration baseline definition 202).

Then, at block 306, draft product baseline is assigned to a product owner. The product owner may be retrieved using the product ID in product information 118. This may include notifying the owner of the existence of the draft product baseline. The notification may be an in-system notification (e.g., within the enterprise via email) or a push notification transmitted to a device associated with the product owner (as stored in product information 118). The notification may include information on the triggering event—such as the type of the event and the origination of the information for the triggering event.

Control may then flow to manager layer 328 where, at block 308 a product owner may confirm the draft product baseline. For example, the product owner may use a user interface served from web server 120 to update or modify what the PACMS layer 324 created at block 304.

Control then flows back to PACMS layer 324 where, at decision block 310, it is determined whether or not the draft product baseline includes parameters that need to be approved by a product manager. Accordingly, if the draft product baseline does include parameters, at block 312, product baseline may be assigned to a product manager.

Then, within manager layer 328, at block 318, product manager may approve or edit the product baseline. As with the product owner, PACMS 102 may notify the product manager that the baseline with the parameters need approval by the manager. Product specific parameters may exist in a product baseline that is more complex, and thus may request the two levels of review presented in FIG. 3 as opposed to a single level of review. However, if it is determined that the draft product baseline does not include product specific parameters, then at block 314 the draft product baseline may be auto-approved without further human input.

Regardless of how the product baseline was approved, at block 316, the existing approved product baseline may be archived. In some instances, the baseline may be discarded. Finally, at block 320, the draft product baseline may be set to the approved product baseline.

Figure 4:
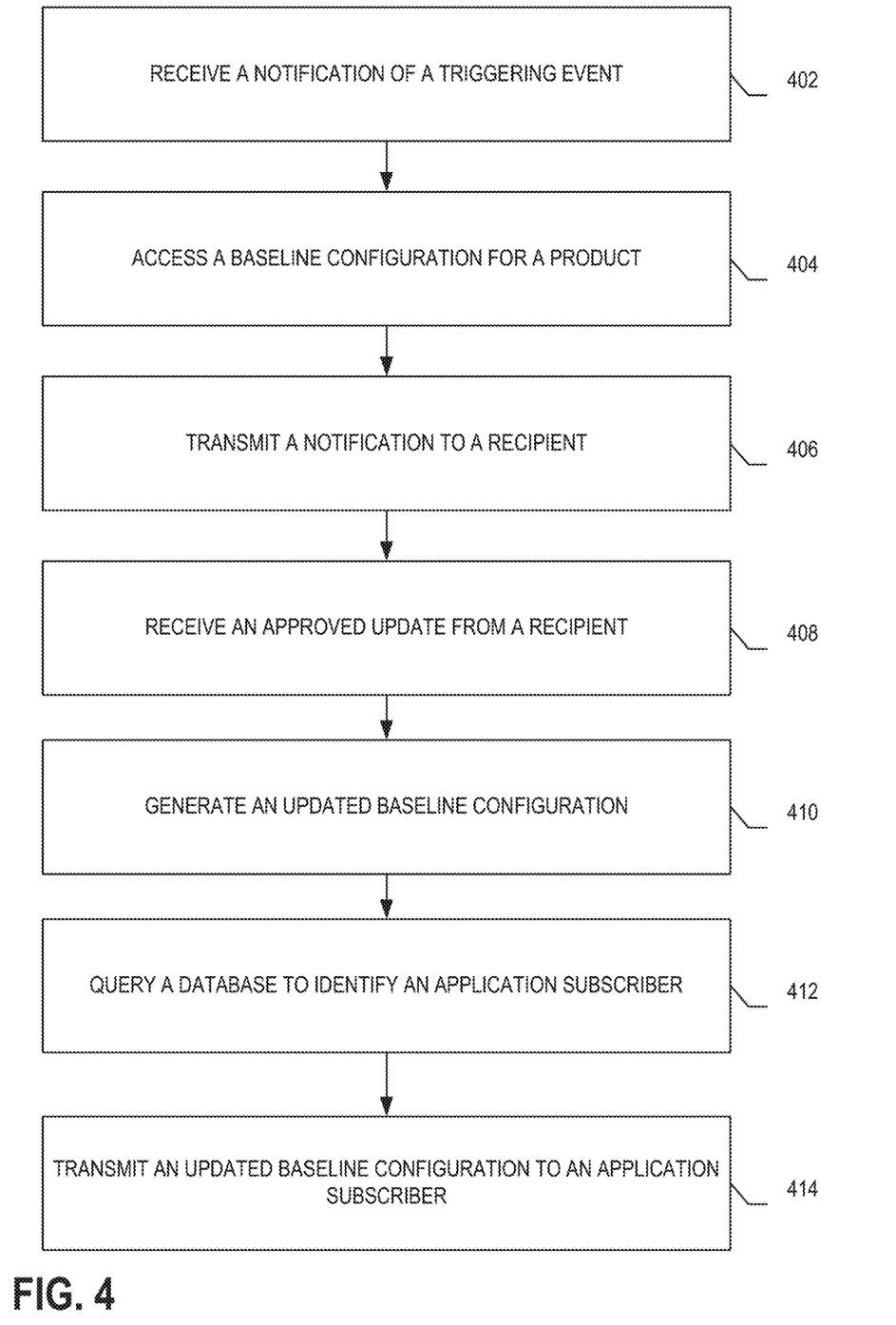
FIG. 4 illustrates a flowchart for responding to a triggering event, according to various examples.

FIG. 4 illustrates a flowchart for responding to a triggering event, according to various examples. The method may be embodied in a set of instructions stored in at least one non-transitory storage device of a computing device(s). The computing device(s) may have one or more processors that execute the set of instructions to configure the one or more processors to perform the operations illustrated in FIG. 4. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 402, in an example, a notification is received of a triggering event. The triggering event may identify an associated product. The identification may be a series of alphanumeric characters, in an example. The notification may be received by a computing system (e.g., PACMS 102) over an API provided by the computing system. Multiple triggering events with the same product identification may be received (e.g., a first triggering event and a second triggering event). A triggering event may also identify an event type. The event type may be "vulnerability event" or "patch event", in various examples. Additionally, the event type may identify the source of the triggering event (e.g., vendor, standards group, etc.).

At operation 404, in an example, a baseline configuration for the product is accessed. The accessing may be automated by the computing system using a product identification included in the triggering event. A central repository of baseline configuration files for products may be maintained. Thus, the computing system may access this repository to check for an existing baseline configuration for the product. In an example, the baseline configuration for a product has been established to include application-agnostic sections according to a data model.

At operation 406, in an example, a notification is transmitted to a recipient responsible for maintaining the baseline configuration for the product. For example, the computing system may maintain a record of the various individuals or groups that are associated with a product and contact information (e.g., e-mail). These records may be queried to determine the recipient and the manner to contact the recipient. The notification may include a copy of the triggering event and a link or copy of the existing baseline configuration for the product.

At operation 408, in an example, an approved update to the baseline configuration may be received from the recipient. The update may originate from the recipient editing the baseline configuration via a web application provided by the computing system. In another example, the recipient may e-mail the approved update to the configuration file to an auto-scraped e-mail address managed by the computing system. In examples in which multiple triggering events are associated with the same product identification, the approved update may address both triggering events.

The approved update to the baseline configuration from the recipient may include receiving changes to operational parameters of the product. The approved update to the baseline configuration from the recipient may include restricting installation of a version of the product. For example, the triggering event may be a vulnerability in a new version of the product and therefore the new version should not be installed on systems of the enterprise until a patch is released.

At operation 410, in an example, an updated baseline configuration for the product may be generated based on the approved update. For example, the central repository of baseline configuration files may be updated to include a new baseline configuration for the product (and discarding or archiving the previous baseline).

At operation 412, in an example, a database may be queried to identify an application subscriber for the triggering event for the product. An application subscriber may be an electronic entity that consumes (e.g., receives and processes) baseline configuration files. For example, an application subscriber may be an enterprise software deployment tool. The database may maintain entries for each product or event type. Accordingly, for any matching application subscribers matching the product identifier or event type, a notification may be generated.

In an example, at operation 414, the updated baseline configuration may be transmitted to any identified application subscriber. In an example, an indication may be received (e.g. over an API) from the identified application subscriber that a set of computing systems have been updated according to the updated baseline configuration. For example, a software deployment tool may examine computing systems it is responsible for and look for installations of the product. Then, the software deployment tool may update the installations according to the updated baseline configuration.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
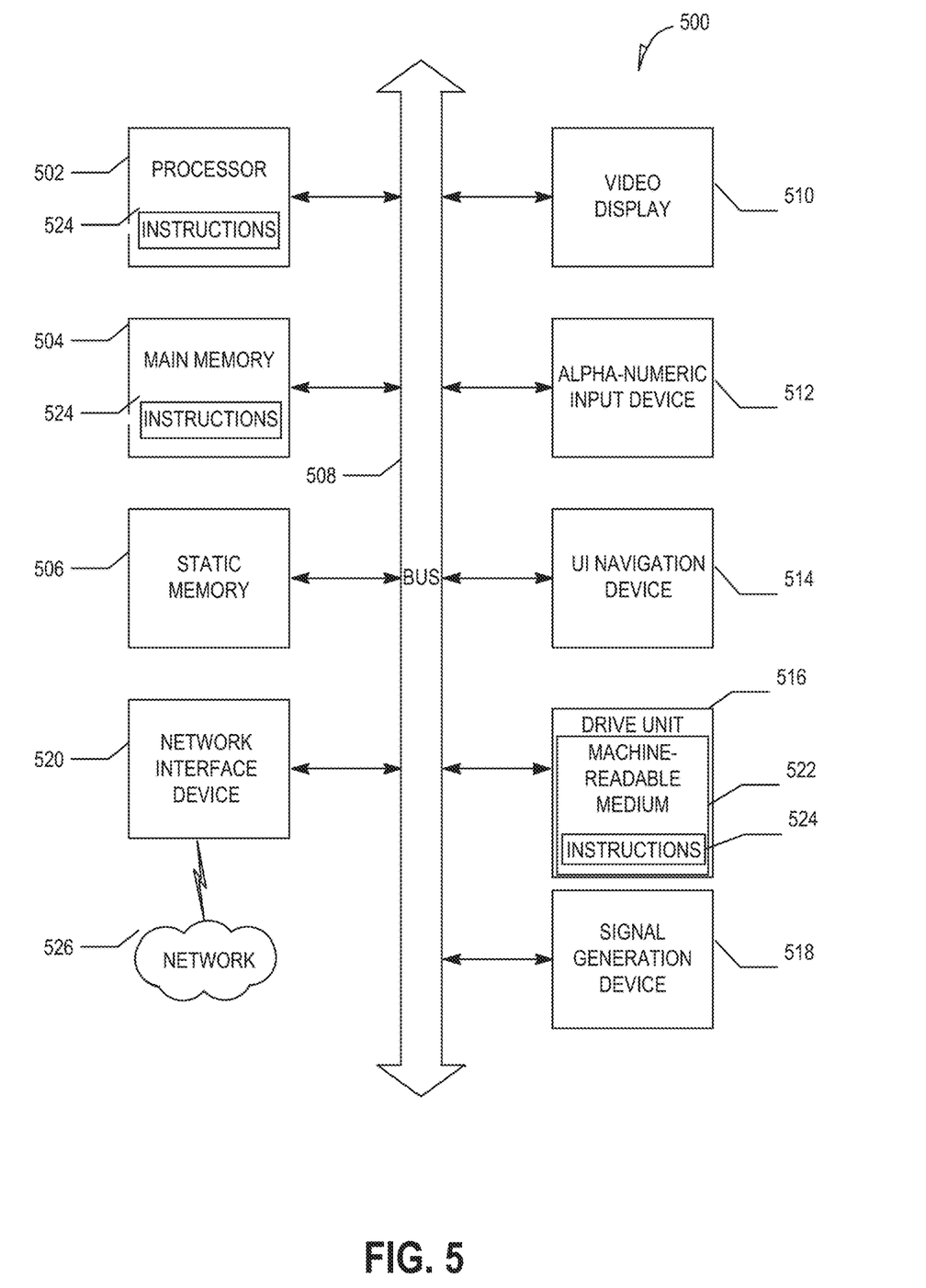
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or another sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 5G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
   providing a subscription model to which a user may subscribe to receive changes to an associated product;
   receiving a subscription request from the user;
   receiving multiple triggers each having product identifiers;
   comparing the product identifiers across triggering events of the multiple triggers;
   deduplicating the triggering events based on the comparison to create a single triggering event, the single triggering event identifying the associated product;
   accessing a baseline configuration for the product, the baseline configuration for the product being a universal configuration file for the product defined according to an application-agnostic data model;
   transmitting, based on the single triggering event and before any changes are made to the baseline configuration, a notification to a recipient responsible for maintaining the baseline configuration for the product;
   receiving an approved update to the baseline configuration from the recipient;
   generating an updated baseline configuration for the product based on the approved update;
   querying a database to identify an application subscriber for the single triggering event for the product; and
   transmitting the updated baseline configuration to the identified application subscriber to the user based on the subscription request.

2. The computer-implemented method of claim 1, further comprising checking, before accessing the baseline configuration, if the baseline configuration exists in response to the notification of the single triggering event.

3. The computer-implemented method of claim 2, further comprising generating the baseline configuration when the baseline configuration does not exist.

4. The computer-implemented method of claim 1, wherein the baseline configuration includes metadata.

5. The computer-implemented method of claim 4, wherein the metadata includes product-specific metadata and product-agnostic metadata.

6. The computer-implemented method of claim 4, wherein the metadata indicates a security policy for the product.

7. The computer-implemented method of claim 1, wherein the notification includes a copy of the single triggering event and a link to the baseline configuration.

8. The computer-implemented method of claim 1, wherein the application subscriber is a system configuration tool.

9. The computer-implemented method of claim 1, wherein the single triggering event includes a product identification of the product.

10. The computer-implemented method of claim 9, wherein the product identification is used to determine whether another user beyond the recipient is required to approve the update.

11. A non-transitory computer readable medium comprising instructions, which when executed by at least one processor, configure the at least one processor to perform operations comprising:
    providing a subscription model to which a user may subscribe to receive changes to an associated product;
    receiving a subscription request from the user;
    receiving multiple triggers each having product identifiers;
    comparing the product identifiers across triggering events of the multiple triggers;
    deduplicating the triggering events based on the comparison to create a single triggering event, the single triggering event identifying the associated product;
    accessing a baseline configuration for the product, the baseline configuration for the product being a universal configuration file for the product defined according to an application-agnostic data model;
    transmitting, based on the single triggering event and before any changes are made to the baseline configuration, a notification to a recipient responsible for maintaining the baseline configuration for the product;
    receiving an approved update to the baseline configuration from the recipient;
    generating an updated baseline configuration for the product based on the approved update;
    querying a database to identify an application subscriber for the single triggering event for the product; and
    transmitting the updated baseline configuration to the identified application subscriber to the user based on the subscription request.

12. The non-transitory computer readable medium of claim 11, the operations further comprising checking, before accessing the baseline configuration, if the baseline configuration exists in response to the notification of the singe triggering event.

13. The non-transitory computer readable medium of claim 12, the operations further comprising generating the baseline configuration when the baseline configuration does not exist.

14. The non-transitory computer readable medium of claim 11, wherein the notification includes a copy of the single triggering event and a link to the baseline configuration.

15. The non-transitory computer readable medium of claim 11, wherein the application subscriber is a system configuration tool.

16. The non-transitory computer readable medium of claim 11, wherein the single triggering event includes a product identification of the product.

17. The non-transitory computer readable medium of claim 16, wherein the product identification is used to determine whether another user beyond the recipient is required to approve the update.

18. A system comprising:
    at least one processor; and
    a storage device comprising instructions, which when executed by the at least one processor, configure the at least one processor to perform operations comprising:

providing a subscription model to which a user may subscribe to receive changes to an associated product;

receiving a subscription request from the user;

receiving multiple triggers each having product identifiers;

comparing the product identifiers across triggering events of the multiple triggers;

deduplicating the triggering events based on the comparison to create a single triggering event, the single triggering event identifying the associated product;

accessing a baseline configuration for the product, the baseline configuration for the product being a universal configuration file for the product defined according to an application-agnostic data model;

transmitting, based on the single triggering event and before any changes are made to the baseline configuration, a notification to a recipient responsible for maintaining the baseline configuration for the product;

receiving an approved update to the baseline configuration from the recipient;

generating an updated baseline configuration for the product based on the approved update;

querying a database to identify an application subscriber for the single triggering event for the product; and transmitting the updated baseline configuration to the identified application subscriber to the user based on the subscription request.

19. The system of claim 18, the operations further comprising checking, before accessing the baseline configuration, if the baseline configuration exists in response to the notification of the singe triggering event.

20. The system of claim 19, the operations further comprising generating the baseline configuration when the baseline configuration does not exist.

\* \* \* \* \*

UNITED STATES PATENT AND TRADEMARK OFFICE
CERTIFICATE OF CORRECTION

| | |
|---|---|
| PATENT NO. | : 11,853,737 B1 |
| APPLICATION NO. | : 17/335842 |
| DATED | : December 26, 2023 |
| INVENTOR(S) | : Lu et al. |

It is certified that error appears in the above-identified patent and that said Letters Patent is hereby corrected as shown below:

In the Claims

In Column 12, Line 43, in Claim 12, delete "singe" and insert --single-- therefor In Column 14, Line 13, in Claim 19, delete "singe" and insert --single-- therefor Signed and Sealed this
Thirteenth Day of February, 2024

*Katherine Kelly Vidal*

Katherine Kelly Vidal
*Director of the United States Patent and Trademark Office*